United States Patent [19]

Loomis

[11] Patent Number: 4,543,440

[45] Date of Patent: Sep. 24, 1985

[54] CURABLE COMPOSITION COMPRISING ELASTOMERIC TERPOLYMER OF CARBON MONOXIDE

[75] Inventor: Gary L. Loomis, Drexel Hill, Pa.

[73] Assignee: E. I. Du Pont de Nemours and Company, Wilmington, Del.

[21] Appl. No.: 587,901

[22] Filed: Mar. 9, 1984

Related U.S. Application Data

[63] Continuation-in-part of Ser. No. 472,752, Mar. 7, 1983, abandoned.

[51] Int. Cl.⁴ .............................................. C08G 67/02
[52] U.S. Cl. .................................... 525/539; 528/271; 528/332; 528/362; 528/392; 528/396
[58] Field of Search ................ 525/539; 528/271, 332, 528/362, 392, 396

[56] References Cited

U.S. PATENT DOCUMENTS

| | | | |
|---|---|---|---|
| 2,457,279 | 12/1948 | Scott | 260/66 |
| 2,495,286 | 1/1950 | Brubaker | 260/63 |
| 2,566,272 | 8/1951 | Werntz | 260/28.5 |
| 3,171,830 | 3/1965 | Kehr | 260/88.2 |
| 3,293,112 | 12/1966 | Kehr | 161/219 |

*Primary Examiner*—Harold D. Anderson
*Attorney, Agent, or Firm*—P. R. Steyermark

[57] ABSTRACT

Terpolymers having 1,4-diketo functionalities and a carbonyl group concentration of about 5–20% of polymer weight can be conveniently cured by heating with an aromatic primary diamine or its precursor and a catalytic amount of an acid having a pKa of at most about 3. Cured polymers have good physical properties and are suitable in such applications as, for example hose, tubing, wire coatings, gaskets, and seals.

14 Claims, 1 Drawing Figure

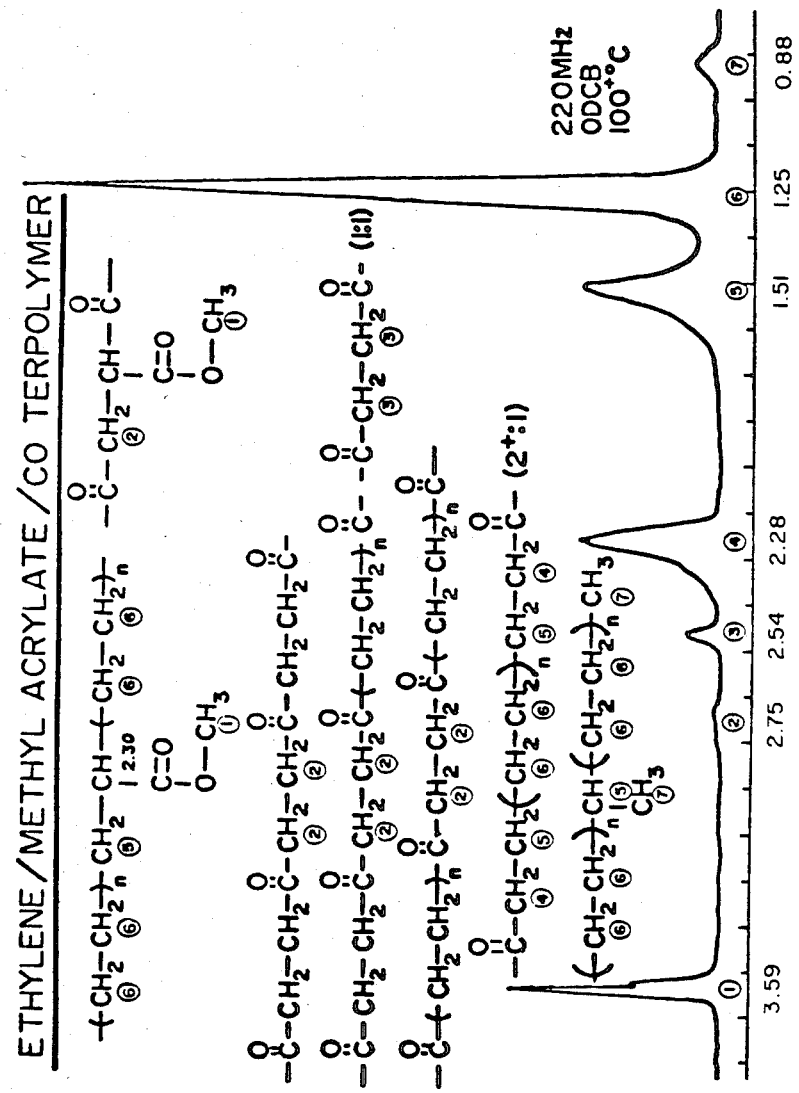

CURABLE COMPOSITION COMPRISING ELASTOMERIC TERPOLYMER OF CARBON MONOXIDE

CROSS-REFERENCE TO RELATED APPLICATION

This is a continuation-in-part of my application Ser. No. 472.752, filed Mar. 7, 1983.

BACKGROUND OF THE INVENTION

This invention relates to certain novel curing systems for copolymers of ethylene with carbon monoxide as well as to curable compositions comprising such copolymers together with a curing system of the type disclosed hereafter and to cured polymers obtained by heating the above curable compositions to their cure temperature.

Dipolymers of carbon monoxide with ethylene and terpolymers with ethylene and another ethylenically unsaturated monomer such as, for example, methyl acrylate, or vinyl acetate are well known. Such copolymers are known to contain 1,4-diketo functions arising from CO/unsaturated monomer/CO triads. Although such polymers can be cured by known free radical techniques, for example, in the presence of peroxides, free radical curing suffers from various shortcomings. Thus, for example, because of the inherently non-discriminating nature of peroxide cures, various customary additives, which could be adversely affected by the peroxide (for example, certain fillers, and plasticizers), cannot be used. Furthermore, peroxides have a deleterious effect on commonly used antioxidants and processing oils.

It is, therefore, desirable to have available a non-peroxide curing system for ethylene/carbon monoxide copolymers.

SUMMARY OF THE INVENTION

According to this invention, there is provided a curing system for elastomeric terpolymers of ethylene with another ethylenically unsaturated monomer and carbon monoxide, in which the ketone carbonyl concentration is about 5–20 weight percent of the polymer, said curing system consisting essentially of about 0.15 to 8.0 mole % of an aromatic primary diamine based on the ketone carbonyl groups of the terpolymer or of a precursor which will liberate a free aromatic primary diamine under the cure conditions, and a catalytic amount of an acid having a pKa of at most about 3 or a precursor capable of liberating such acid under the cure conditions.

There also are provided curable polymer compositions comprising a terpolymer of ethylene with another ethylenically unsaturated monomer and with carbon monoxide and the above diamine/acid curing system.

Finally, there also is provided a process for curing polymers by heating the above curable compositions to a temperature at which curing takes place.

BRIEF DESCRIPTION OF THE DRAWING

The drawing is a proton nuclear magnetic resonance (nmr) spectrum of an ethylene/methyl acrylate/carbon monoxide terpolymer wherein specific types of protons are correlated with polymer structural units.

DETAILED DESCRIPTION OF THE INVENTION

Unless the CO group content is at least about 5% of the copolymer weight, the statistical distribution of CO groups throughout the molecule may result in a number of CO/ethylenic monomer/CO triads which is too small for effective crosslinking. The preferred ketone CO group concentration is 8–12 weight percent of the polymer weight. A typical terpolymer which can be successfully cured according to the process of the present invention contains about 35% of ethylene, 55% of methyl acrylate, and 10% of carbon monoxide. High CO group concentrations, above about 20 weight percent, result in stiff, nonelastomeric cured polymers. For the purpose of this disclosure, an elastomer is defined as a polymer which, when stretched to twice its length and released, at room temperature, returns with force to its original length.

The carbon monoxide concentration of ethylene/unsaturated monomer/carbon monoxide terpolymers can be determined by nuclear magnetic resonance (nmr) analysis. Pertinent structural assignments are as follows:

For $CH_3$ of methyl acrylate $\delta=3.59$ ppm. For ethylene $CH_2$ in $\alpha$-position to CO in 1:1 ethylene/CO structural units $\delta=3.00-2.40$ ppm.

For $CH_2$ in $\alpha$-position to CO in other structural units and for CH of

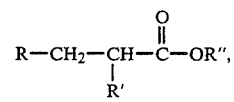

where R' and R" are alkyl groups $\delta=2.40-2.00$ ppm. For $CH_2$ in $\beta$-position to CO $\delta=1.55$ ppm.

Those terpolymers normally fall in the following structural types:

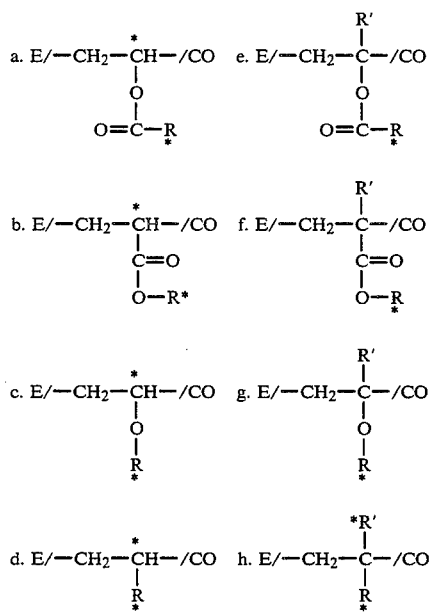

where E stands for the ethylene group, and R stands for an alkyl group. The starred groups are those containing protons used in the calculations.

The amount of ethylenically unsaturated monomer X in E/X/CO terpolymers is calculated from the areas of the nmr peaks corresponding to the starred groups. Corrections for other protons associated with monomer X can then be made in the spectrum.

The monomer composition of an ethylene/methyl acrylate/carbon monoxide terpolymer is calculated as shown below to illustrate the practical application of the nmr method. In the following discussion MA stands for methyl acrylate. Circled numbers correspond to those shown in the drawing.

Regardless of its environment, the MA methyl has one resonance (line ①) at 3.59 ppm.

$$\frac{①}{3} = A \text{ the number of units due to one proton of MA.}$$

$\alpha$-methylenes of E/CO in 1,4 dione or 1:1 units, lines ② and ③.

$$\frac{2 + 3}{4} = B \text{ the number of units due to one proton of ethylene in 1:1 units. This number is also used to calculate the CO composition.}$$

$\alpha$-methylenes of E/CO in (2 or more):1 units, line ④.

$$\frac{4 - A}{4} = C \text{ the number of units due to one proton of ethylene in (2 or more):1 units. Area is corrected for the MA methylene contributions by subtracting out } A.$$

All the remaining lines ⑤, ⑥, ⑦

$$\frac{5 + 6 + 7 - 2(A)}{4} = D \text{ the number of units due to one proton of ethylene not involved with CO corrected for MA methylene contribution.}$$

Carbon monoxide
$B + C = F$ the number of units due to one mole of CO.
Total ethylene $$B + C + D = G \text{ the number of units due to one mole of ethylene.}$$

$$\frac{A(86)\ (100)}{A(86) + E(28) + F(28)} = K \text{ Wt. \% MA in the terpolymer}$$

$$\frac{E(28)\ (100)}{A(86) + E(28) + F(28)} = L \text{ Wt. \% CO in the terpolymer}$$

$$\frac{F(28)\ (100)}{A(86) + E(28) + F(28)} = N \text{ Wt. \% E in the terpolymer}$$

Analysis of similar CO-containing terpolymers by nmr spectroscopy is discussed, for example, in Chapter 4 (J. E. McGrath et al) of *Applications of Polymer Spectroscopy*, edited by E. G. Brame, Jr., Academic Press, New York, 1978, pp. 42–55.

Typical copolymerizable ethylenically unsaturated monomers X in the terpolymers include, $\alpha,\beta$-unsaturated $C_3$–$C_{20}$ mono- and dicarboxylic acids, vinyl esters of saturated $C_1$–$C_{18}$ carboxylic acids, alkyl esters of $\alpha,\beta$-unsaturated $C_3$–$C_{20}$ mono- and dicarboxylic acids, vinyl $C_1$–$C_{18}$ alkyl ethers, acrylonitrile, methacrylonitrile, copolymerizable unsaturated hydrocarbons such as $C_3$–$C_{12}$ $\alpha$-olefins, cyclic hydrocarbons such as norbornene, and vinyl aromatic compounds such as styrene.

The reaction of 1,4-diketo groups with primary aromatic amines is believed to result in the formation of a stable pyrrole structure, as shown in the equation below:

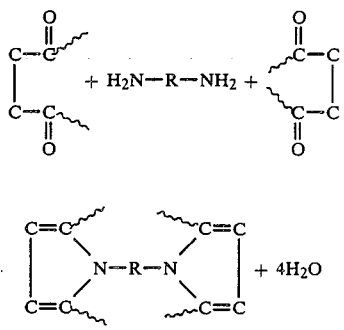

wherein R stands for an aromatic divalent organic radical, and the wavy lines represent polymer chains.

The primary aromatic diamine, $H_2N$—R—$NH_2$ can be any diamine, including diamines in which R contains heteroatoms, such as, for example, N, S, or O. Suitable diamines include, for example, p,p'-methylenedianiline, p-phenylenediamine, p,p'-oxydianiline, p-toluidine, and 2,4-toluenediamine. Polymers cured with such diamines have very good thermal and hydrolytic stability. Methylenebis(o-chloroaniline) also can be used, although this chemical has been designated as a potential carcinogen and is no longer commercially available from the Du Pont Company; it is still available, however, from other manufacturers.

Free diamines may react quite fast with 1,4-diketo copolymers and therefore form scorchy compositions. The most suitable diamine components of the compositions of the present invention are blocked diamines, which decompose under the cure conditions, thus releasing the free diamine in situ. A typical blocking group is the carbamate. Blocked diamines provide excellent processing safety. Aliphatic diamines are very scorchy, even in precursor form, such as, for example, hexamethylenediamine carbamate. Further, reactions with aliphatic diamines appear to be reversible. For these reasons, aliphatic diamines are not suitable in the compositions of the present invention.

For the purpose of the present disclosure, the term "aromatic" means that there is present at least one cyclic structure having a system of conjugated double bonds, as, e.g., in benzene or naphthalene.

The diamine or diamine precursor concentration is fairly critical in that effective crosslinking will not be obtained below the lower limit of the above recited range, while above the upper limit reaction of the cure sites (1,4-diketo groups) with one amine group of the diamine will result in a polymer containing amine-terminated pendant groups, rather than in a crosslinked polymer.

The crosslinking reaction according to the present invention is catalyzed by acids, which may be inorganic or organic, so long as their pKa is no more than about 3. In addition to normal inorganic acids such as, for example, sulfuric, phosphorous, phosphoric, or hydrochloric, various organophosphonous and organophosphonic acids, sulfonic acids, chloroacetic acids, salicylic acid, and malonic acid are suitable catalysts. It is practical to use acid precursors, which form the free acids under cure conditions, thus further increasing the processing safety of the compositions of this invention. Typical such precursors are, for example various acid esters, which decompose to liberate the acids. Such precursors include various alkyl tosylates, which are known to undergo pyrolysis to p-toluenesulfonic acid (pKa=0.70) and the corresponding alkene, as shown below:

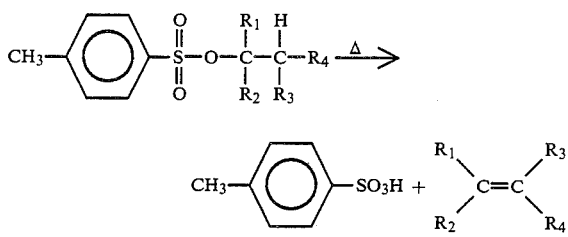

A commercial antioxidant, tri(mixed mono- and dinonyl phenyl)phosphite, sold by Uniroyal under the name "Polygard", proved to be an effective cure catalyst. This material is known to slowly hydrolyze in the presence of moisture to liberate phosphorous acid, which always is present in a small amount in the commercial material. The pKa is about 2. A sample of "Polygard" was found to contain about 1.1 weight percent (0.013 mole/100 g) of phosphorous acid.

The maximum cure rates are obtained when the molar ratio of the acid catalyst to the diamine curing agent is close to 0.1. Acceptable rates are still obtained when this ratio is as low as 0.03 or as high as 1. No significant improvement can be expected above that latter ratio, while a large amount of a strong acid could cause polymer degradation.

The use of blocked diamine or polyamine curing agent and/or blocked acid catalyst (that is, precursors of the diamine or polyamine and of the acid) improves the processing safety of the polymer compound. The cure temperature preferably should be the same for the curing system of the present invention as normally is employed for polymer cures, so that no equipment or operating procedure modifications will be required. The usual industrial cure temperature of about 177° C. is suitable in the present process. Naturally, when a protected curing agent or acid catalyst is employed, it must be so chosen that its thermal decomposition to the free amine and/or free acid occurs at the cure temperature at a satisfactory rate.

Polymer compounds containing the curing agent and acid catalyst are prepared by standard mixing techniques, for example, in a rubber mill or an internal mixer.

Curing carbonyl group-containing terpolymers according to this invention gives products which have good physical properties and are suitable in such applications as, for example, hose, tubing, wire coating, gaskets, seals, coated fabrics, and sheet goods.

This invention is now illustrated by examples of certain preferred embodiments thereof, where all parts, proportions, and percentages are by weight unless indicated otherwise, except that curing agent and catalyst concentrations are also expressed as mole % based on ketone carbonyl groups. For methylenedianiline complexes with alkali metal chlorides the mole % concentration is calculated on the basis of free methylenedianiline. The abbreviation "phr" means "parts per 100 parts of polymer". All the cured polymeric compositions of this invention were elastomeric.

EXAMPLE 1

Polymer Preparation

An ethylene/methyl acrylate/carbon monoxide (E/MA/CO) 35/55/10 terpolymer is prepared according to the general processes of U.S. Pat. Nos. 2,495,286 to Brubaker and 3,780,140 to Hammer in a continuous, stirred, high pressure 725 mL polymerization reactor at 190° C. and 186 MPa. In a typical run, the feed stream compositions, flow rates and polymer composition are as follows:

| Feed | Composition (parts) | Rate, (kg/hr) |
|---|---|---|
| Ethylene | ethylene (100) | 6.36 |
| Comonomer 1 | methyl acrylate (100) monoethyl ether of hydroquinone (100 ppm) 2,6-di-t-butyl-4-methyl phenol (220 ppm) | 1.19[1] |
| Comonomer 2 | CO (100) | 0.30 |
| Solvent | methanol (25) t-butyl alcohol (75) | 0.27[2] |
| Catalyst Solution | 2-t-butylazo-2-cyano-4-methoxy-methylpentane (1512 ppm) methanol (25) t-butyl alcohol (75) | 0.5[3] |
| Telogen | acetone (100) | 0.45 |

[1]Total Comonomer 1 composition feed rate
[2]Total solvent feed rate
[3]Total catalyst solution feed rate Other E/MA/CO polymer compositions are prepared by variations in the reaction paramters such as comonomer solution composition, relative feed rates of the monomer streams, temperature, pressure, and monomer conversion.

EXAMPLE 2

Curing of an E/MA/CO terpolymer with a complex of methylenedianiline with lithium chloride A terpolymer having a composition of 53% E, 37% MA, and 10% CO, 100 parts, was compounded on a water-cooled, two-roll rubber mill with 50 parts of SRF (N774) carbon black, 1 part of substituted diphenylamine antioxidant ("Naugard" 445, Uniroyal), 1 part tri(mixed mono- and dinonyl phenyl)phosphite ("Polygard", Uniroyal) and various quantities of lithium chloride complex of methylenedianiline. $(MDA)_3LiCl$.

Slabs for specimens for the determination of tensile properties and pellets for compression set measurements were cured in presses at about 4.5 MPa pressure and 177° C. Molds were loaded and unloaded hot. The stress-strain properties—$M_{100}$ (100% modulus), $M_{200}$ (200% modulus), $T_B$ (tensile strength at break), and $E_B$ (percent elongation at break)-were measured by ASTM method D-412. Compression set (Comp. Set B) of the cured pellets was measured by ASTM method D-395.

Table I shows the results obtained with press cures of 30 minutes and 60 minutes with several concentrations of the curing agent. The acid catalyst required for the crosslinking reaction is supplied by the acid impurities known to be present in the "Polygard" antioxidant. The omission of "Polygard" in these stocks without the inclusion of some other acid catalyst fails to produce a vulcanized polymer under the same press cure conditions.

TABLE I
VULCANIZATE PROPERTIES OF (MDA)$_3$LiCl-CURED E/MA/CO TERPOLYMER*

| | Cure Time | | | |
|---|---|---|---|---|
| | 60 min | | 30 min | |
| | A | B | C | D |
| (MDA)$_3$LiCl, phr | 1.22 | 2.01 | 2.80 | 1.50 |
| mole % | 1.64 | 2.69 | 3.72 | 2.08 |
| M$_{100}$ (MPa) | 2.8 | 6.8 | 9.0 | 7.5 |
| M$_{200}$ (MPa) | 9.1 | — | — | — |
| T$_B$ (MPa) | 15.5 | 13.6 | 15.2 | 15.9 |
| E$_B$ (%) | 290 | 160 | 145 | 190 |
| Shore A, Hardness | 55 | 60 | 66 | 57 |
| Compression Set B 70 hr/100° C. | 23 | 26 | 29 | 12 |
| Compression Set B 70 hr/150° C. | 34 | 30 | 32 | 24 |

*Recipe:
E/MA/CO terpolymer (100)
Carbon Black (50)
"Polygard" (1)
"Naugard" 445 (1)
(MDA)$_3$LiCl (as shown)

EXAMPLE 3

Vulcanizate properties of E/MA/CO terpolymers cured with (MDA)$_3$LiCl complex

Four E/MA/CO terpolymers having different proportions of monomers were individually compounded as described in Example 1. Table II shows the properties of vulcanizates obtained after a one-hour cure at 177° C. followed by a post-cure of four hours at 150° C. As in Example 2, "Polygard" functions as the required acid catalyst.

TABLE II
VULCANIZATE PROPERTIES OF (MDA)$_3$LiCl-CURED E/MA/CO TERPOLYMER

| | A | B | C | D |
|---|---|---|---|---|
| Polymer* | 100 | 100 | 100 | 100 |
| (MDA)$_3$LiCl, phr | 2.6 | 2.6 | 2.6 | 2.6 |
| mole % | 5.0 | 4.5 | 4.2 | 3.9 |
| M$_{100}$ (MPa) | 5.0 | 6.6 | 7.1 | 6.6 |
| M$_{200}$ (MPa) | 16.0 | 19.0 | — | 19.1 |
| T$_B$ (MPa) | 17.9 | 20.3 | 20.3 | 20.5 |
| E$_B$ (%) | 207 | 203 | 200 | 203 |

*A — 43.8% E/49.1% MA/7.1% CO
B — 41.0% E/51.2% MA/7.8% CO
C — 37.6% E/53.9% MA/8.5% CO
D — 38.1% E/53.0% MA/8.9% CO

EXAMPLE 4

Stocks were compounded on a water-cooled, two-roll rubber mill. Oscillating Disk Rheometer (ODR) measurements were obtained on the uncured stocks at 177° C. by ASTM Method D-2705. The cure rates were determined by measuring the maximum slope of the ODR traces.

Table III shows cure rates obtained with the following diamines; methylenedianiline, methylenedianiline-sodium chloride complex, p-phenylenediamine, m-phenylenediamine, 4-aminophenyl ether and 4,4'-diaminodiphenyl disulfide as curing agents with "Polygard" functioning as the required acid catalyst. In stocks B, C, E, F, and G cyclohexyl tosylate also was added as a precursor of p-toluenesulfonic acid.

The ODR data for stock A compared with stocks B and C, and similarly stock D compared with E clearly demonstrate the very large rate enhancements, evidenced by increases of maximum slope, obtained by the inclusion of this additional acid catalyst.

TABLE III

| | A | B | C | D | E | F | G | H | I |
|---|---|---|---|---|---|---|---|---|---|
| Polymer (1)* | 100 | 100 | 100 | 100 | 100 | 100 | 100 | | |
| Polymer (2)** | | | | | | | | 100 | 100 |
| SRF (N774) Carbon Black | 50 | 50 | 50 | 50 | 50 | 50 | 50 | 50 | 50 |
| "Naugard" 445 | 1.0 | 1.0 | 1.0 | 1.0 | 1.0 | 1.0 | 1.0 | 1.0 | 1.0 |
| Curing agent | | | | | | | | | |
| MDA, phr | 1.25 | 1.25 | 1.50 | | | | | | |
| mole % | 1.84 | 1.84 | 2.22 | | | | | | |
| (MDA)$_3$NaCl, phr | | | | 2.00 | 2.00 | | | | |
| mole % | | | | 2.67 | 2.67 | | | | |
| p-phenylenediamine, phr | | | | | | 1.09 | | | |
| mole % | | | | | | 2.9 | | | |
| m-phenylenediamine, phr | | | | | | | 1.09 | | |
| mole % | | | | | | | 2.9 | | |
| 4-aminophenyl ether, phr | | | | | | | | 1.49 | |
| mole % | | | | | | | | 2.6 | |
| 4,4'-diaminodiphenyl disulfide, | | | | | | | | | |
| phr | | | | | | | | | 1.87 |
| mole % | | | | | | | | | 2.6 |
| Acid Catalyst | | | | | | | | | |
| "Polygard", phr | 1.0 | 1.0 | 1.0 | 1.0 | 1.0 | 1.0 | 1.0 | 1.0 | 1.0 |
| cyclohexyl tosylate, phr | | 1.20 | 0.96 | | 1.20 | 0.20 | 0.20 | | |
| mole % | | 1.34 | 1.67 | | 1.34 | 0.23 | 0.23 | | |
| ODR at 177° C. | | | | | | | | | |
| Minimum torque, N · m | 0.15 | 0.23 | 0.41 | 0.42 | 0.38 | 0.43 | 0.50 | 0.25 | 0.38 |
| Maximum torque (at 60 minutes), N · m | 3.45 | 5.68 | 5.06 | 5.14 | 6.10 | 5.65 | 5.50 | 2.99 | 1.83 |
| Maximum slope, | 0.48 | 2.85 | 1.93 | 0.62 | 2.09 | 1.16 | 0.98 | 0.24 | 0.11 |

TABLE III-continued

|   | A | B | C | D | E | F | G | H | I |
|---|---|---|---|---|---|---|---|---|---|
| N · m/min | | | | | | | | | |

*Polymer (1) — 52.8% E/37.3% MA/9.9% CO
**Polymer (2) — 54.5% E/37.5% MA/8.0% CO

EXAMPLE 5

Evaluation of acid catalysts

Stocks were compounded as shown in Table IV. Cure rates at 177° C. were measured as in Example 13. Acid strength is given as pKa at 25° C. in water. The data in Table IV show the cure rates obtained with the lithium chloride complex of methylenedianiline as the curing agent and different acid catalysts. The (MDA) LiCL complex was used in all runs at the level of 1.59 phr (2.9 mole %). It will be noted that the cure rates increase with acid strength. For example, in the presence of 2,6-dihydroxybenzoic acid (pKa=1.22) the cure is 6.8 times faster than in the presence of 2,4-dihydroxybenzoic acid (pKa=3.29). Acids with pKa in range of 4 to 5 give low rates of cure, while acids with pKa in the range of 2.5 to 3.0 give moderate rates of cure, and acids with pKa of less than 2.0 give fast rates of cure.

(MDA) as the curing agent. Cyclohexyl tosylate was the acid catalyst, but its concentration, based on 100 parts of the compounded rubber, was varied as shown in Table V.

The data presented in Table V show that cyclohexyl tosylate in concentrations as low as 0.06 part is an effective accelerator for the MDA cure of this E/MA/CO terpolymer, and that very fast rates are obtained with concentrations above 0.15 part.

TABLE V

|   | A | B | C | D | E | F |
|---|---|---|---|---|---|---|
| Compounded Rubber | 100 | 100 | 100 | 100 | 100 | 100 |
| Cyclohexyl Tosylate, | | | | | | |
| phr | 1.19 | 0.90 | 0.60 | 0.30 | 0.15 | 0.06 |
| mole % | 1.8 | 1.4 | 0.9 | 0.5 | 0.2 | 0.1 |
| ODR at 177° C. | | | | | | |
| Minimum torque, N · m | 0.09 | 0.10 | 0.11 | 0.12 | 0.08 | 0.11 |
| Maximum torque (at 60 minutes), N · m | 4.84 | 4.63 | 4.60 | 4.52 | 4.30 | 4.70 |
| Maximum slope, | 1.12 | 1.12 | 1.01 | 1.01 | 0.70 | 0.28 |

TABLE IV

|   | A | B | C | D | E | F | G | H | I |
|---|---|---|---|---|---|---|---|---|---|
| Polymer (1)* | 100 | 100 | | | | | | 100 | 100 |
| Polymer (2)** | | | 100 | 100 | 100 | 100 | 100 | | |
| SRF (N774) Carbon Black | 50 | 50 | 50 | 50 | 50 | 50 | 50 | 50 | 50 |
| (MDA)₃LiCl, phr | 1.59 | 1.59 | 1.59 | 1.59 | 1.59 | 1.59 | 1.59 | 1.59 | 1.59 |
| mole % | 2.87 | 2.87 | 2.87 | 2.87 | 2.87 | 2.33 | 2.33 | 2.87 | 2.87 |
| Acid Catalyst (pKa) | | | | | | | | | |
| Trimethylacetic acid (5.03), phr | 0.42 | | | | | | | | |
| mole % | 1.60 | | | | | | | | |
| Benzoic Acid (4.19), phr | | 0.50 | | | | | | | |
| mole % | | 1.60 | | | | | | | |
| Diethylmalonic acid (3.15), phr | | | 0.22 | | | | | | |
| mole % | | | 0.53 | | | | | | |
| Cyanoacetic acid (2.45), phr | | | | 0.14 | | | | | |
| mole % | | | | 0.63 | | | | | |
| 2,4-Dihydroxybenzoic acid (3.29), phr | | | | | 2.20 | | | | |
| mole % | | | | | 0.49 | | | | |
| 2,5-Dihydroxybenzoic acid (Unknown but believed to be about 3.3), phr | | | | | | 0.20 | | | |
| mole % | | | | | | 0.49 | | | |
| 2,6-Dihydroxybenzoic acid (1.22), phr | | | | | | | 0.20 | | |
| mole % | | | | | | | 0.49 | | |
| p-Methoxyphenylphosphonic acid (<2), phr | | | | | | | | 0.78 | |
| mole % | | | | | | | | 1.35 | |
| p-Methoxyphenylphosphinic acid (<2), phr | | | | | | | | | 0.72 |
| mole % | | | | | | | | | 1.35 |
| ODR at 177° C. | | | | | | | | | |
| Minimum torque, N · m | 0.17 | 0.23 | 0.28 | 0.53 | 0.15 | 0.18 | 0.51 | 0.28 | 0.45 |
| Maximum torque (at 60 minutes), N · m | 0.90 | 2.30 | 2.00 | 3.16 | 1.56 | 2.97 | 3.49 | 4.60 | 4.40 |
| Maximum slope, N · m/min | 0.03 | 0.06 | 0.289 | 0.41 | 0.108 | 0.194 | 0.739 | 1.06 | 1.14 |

*Polymer (1) — 38.4% E/54.3% MA/7.3% CO
**Polymer (2) — 36.2% E/54.8% MA/9.0% CO

EXAMPLE 6

An E/MA/CO 38.4/54.3/7.3% terpolymer, 100 parts, was compounded by the technique used in the previous examples with 50 parts of SRF (N-774) carbon black and 1.5 parts (2.87 mole %) of methylenedianiline TABLE V-continued

| | A | B | C | D | E | F |
|---|---|---|---|---|---|---|
| N · m/min | | | | | | |

Recipe:
Polymer E, 38.4%/MA, 54.3%/CO, 7.3% (100 parts)
SRF (N-774) Carbon Black (50 parts)
Methylenedianiline (1.5 parts, 2.87 mole %)
Cyclohexyl tosylate (as shown)

EXAMPLE 7

An E, 36.2%/MA, 54.8%/CO, 9.0% terpolymer was compounded as shown in Table VI. The concentration of methylenedianiline, which was the curing agent, was varied.

The ODR data in Table VI show that both the cure rate (evidenced by changes in maximum slope) and the state of cure (evidenced by changes in maximum torque) rise through a maximum and then decrease as a function of methylenedianiline concentration, and that this maximum occurs at a diamine concentration of 0.01 mole/100 g of polymer. It is well known that this type behavior is indicative of systems in which the polymer contains a limited cure site concentration. For the above example this data indicates a cure site concentration of 0.02 mole/100 g of polymer. The cure sites are attributed to 1,4-diketone functionalities that arise from CO/ethylene/CO triads in the polymer chain.

TABLE VI

| | A | B | C | D | E | F | G | H |
|---|---|---|---|---|---|---|---|---|
| Polymer* | 100 | 100 | 100 | 100 | 100 | 100 | 100 | 100 |
| SRF (N-774) Carbon Black | 50 | 50 | 50 | 50 | 50 | 50 | 50 | 50 |
| Cyclohexyl Tosylate, phr | 0.33 | 0.33 | 0.33 | 0.33 | 0.33 | 0.33 | 0.33 | 0.33 |
| mole % | 0.40 | 0.40 | 0.40 | 0.40 | 0.40 | 0.40 | 0.40 | 0.40 |
| Methylenedianiline (MDA), phr | 0.39 | 0.78 | 1.19 | 1.58 | 1.97 | 2.36 | 3.13 | 3.94 |
| mole % | 0.6 | 1.2 | 2.0 | 2.5 | 3.1 | 3.8 | 5.0 | 6.3 |
| ODR at 177° C. | | | | | | | | |
| Minimum torque, N · m | 0.24 | 0.31 | 0.34 | 0.34 | 0.28 | 0.32 | 0.29 | 0.29 |
| Maximum torque (at 60 minutes, N · m | 1.42 | 2.49 | 3.51 | 4.55 | 3.29 | 5.46 | 5.38 | 4.52 |
| Maximum slope, N · m/min | 0.42 | 0.86 | 1.01 | 1.01 | 0.99 | 0.90 | 0.75 | 0.45 |

*Polymer — 36.2% E/54.8% MA/9.0% CO

I claim:

1. A curable composition comprising an elastomeric terpolymer of ethylene with carbon monoxide and with another ethylenically unsaturated monomer, in which ketone carbonyl concentration is about 5–20% of the polymer weight and a curing system for said polymer consisting essentially of about 0.15 to 8.0 mole % of an aromatic primary diamine based on the ketone carbonyl groups or an equivalent amount of a precursor which will liberate free diamine under the cure conditions, and a catalytic amount of an acid having a pKa of at most about 3 or a precursor capable of liberating an equivalent amount of such acid under the cure conditions.

2. A composition of claim 1 wherein the ketone carbonyl group concentration is 8–12% of the polymer weight.

3. A composition of claim 1 wherein the polymer is a terpolymer of ethylene with carbon monoxide and a monomer selected from the group consisting of $\alpha,\beta$-unsaturated $C_3$–$C_{20}$ mono- and dicarboxylic acids, vinyl esters of saturated $C_1$–$C_{18}$ carboxylic acids, alkyl esters of $\alpha,\beta$-unsaturated $C_3$–$C_{20}$ mono- and dicarboxylic acids, vinyl $C_1$–$C_{18}$ alkyl esters, acrylonitrile, methacrylonitrile, and copolymerizable unsaturated hydrocarbons.

4. A composition of claim 2 wherein the copolymerizable hydrocarbons are $C_3$–$C_{12}$ $\alpha$-olefins, norbornene, or vinylaromatic compounds.

5. A composition of claim 3 wherein the polymer is an ethylene/methyl acrylate/carbon monoxide terpolymer.

6. A composition of claim 1 wherein the molar ratio of the acid to the diamine is 0.03 to 1.

7. A composition of claim 5 wherein the molar ratio of the acid to the diamine is about 0.1.

8. A composition of claim 1 wherein a diamine precursor is present as its carbamate.

9. A composition of claim 1 wherein the acid catalyst is phosphorous acid or a mixture of phosphorous acid with a phosphite ester.

10. A composition of claim 1 wherein the acid catalyst is an alkyl tosylate.

11. A cured polymer obtained by heating a composition of claim 1 to a temperature at which cure takes place.

12. A cured polymer obtained by heating a composition of claim 3 to a temperature at which cure takes place.

13. A composition of claim 1 wherein the primary diamine present in the curing system is present in the form of a complex with an alkali metal halide.

14. A composition of claim 13, wherein the primary diamine is p,p'-methylenedianiline.

* * * * *